United States Patent [19]

Lund-lack

[11] Patent Number: 5,649,814

[45] Date of Patent: Jul. 22, 1997

[54] DRIVER FOR LEVITATION COILS OF A MAGNETIC BEARING

[75] Inventor: Stephen Geoffrey Lund-lack, Eastburne, Great Britain

[73] Assignee: The BOC Group plc, Windlesham, England

[21] Appl. No.: 433,587

[22] Filed: May 3, 1995

[30] Foreign Application Priority Data

May 5, 1994 [GB] United Kingdom ............... 9408959

[51] Int. Cl.$^6$ ........................................... H02K 7/09
[52] U.S. Cl. ........................ 417/423.7; 417/423.12; 310/90.5
[58] Field of Search ................ 417/423.4, 423.7, 417/423.12; 310/90.5

[56] References Cited

U.S. PATENT DOCUMENTS

| | | | |
|---|---|---|---|
| 5,262,692 | 11/1993 | Williams et al. | 310/90.5 |
| 5,264,982 | 11/1993 | Cox et al. | 310/90.5 |
| 5,355,040 | 10/1994 | New | 310/90.5 |
| 5,522,694 | 6/1996 | Bernhardt et al. | 310/90.5 |

FOREIGN PATENT DOCUMENTS

| | | |
|---|---|---|
| 0 430 009 A1 | 6/1991 | France . |
| 195 06 849 A1 | 8/1995 | Germany . |
| 0535 916 AE | 4/1993 | United Kingdom . |
| 0 549 004 A | 6/1993 | United Kingdom . |

OTHER PUBLICATIONS

Patent Abstracts of Japan, vol. 10, No. 37 (M453) 14 Feb. 1986 & JP A –60 190697 Seiko Seiki KK, 28 Sep. 1985.

*Primary Examiner*—Roland McAndrews
*Attorney, Agent, or Firm*—David M. Rosenblum; Salvatore P. Pace

[57] ABSTRACT

An apparatus for driving levitation coils of a magnetic bearing provided with a DC power source and a motor drive device powered by the power source. A DC motor is driven by the motor drive and the output from the motor is linked to a switching amplifier. The output from the amplifier is linked to the levitation coils of the magnetic bearing. A feedback control is provided from the magnetic bearing to the amplifier to position a rotor associated with the levitation coils in response to the amplifier output. The DC power source also directly powers the switching amplifier.

6 Claims, 1 Drawing Sheet

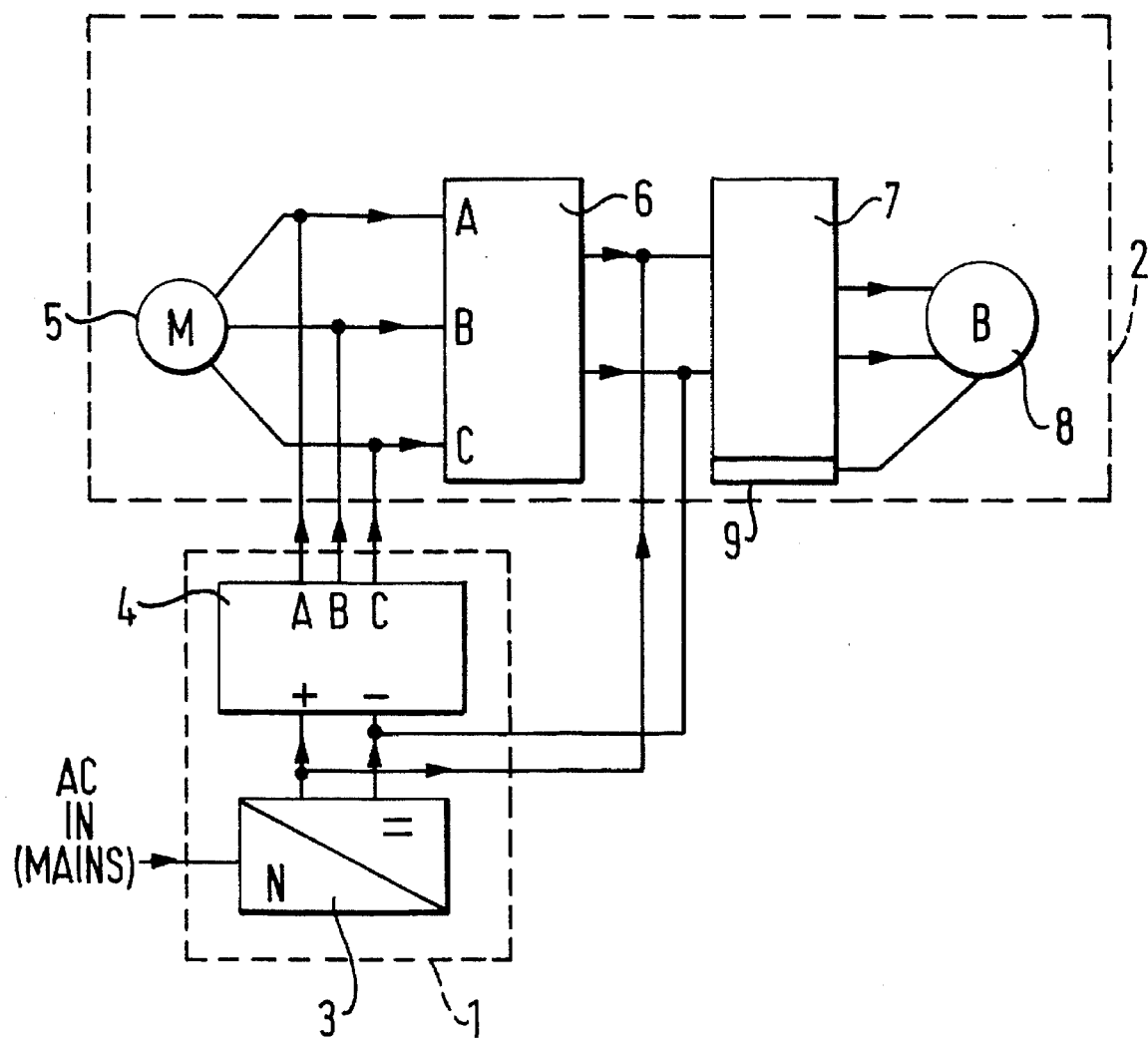

DRIVER FOR LEVITATION COILS OF A MAGNETIC BEARING

BACKGROUND OF THE INVENTION

This invention relates to circuitry for use with magnetic bearings and, more particularly, to that for use with such bearings supporting a shaft rotating at high speeds.

The use of magnetic bearings to support a rotating shaft has found application in a number of different areas. One area is that of turbo-molecular vacuum pumps which include a shaft or rotor on one end of which is positioned an array of rotor blades which need to be rotated at high speed within the confines of a closely corresponding stator housing and blades. There is a great benefit in using magnetic levitation means as the rotor bearing.

In a known arrangement for driving levitation coils associated with such magnetic levitation means, an AC source of electric power is rectified to DC and supplied to a controller in which the source is rectified to a DC supply which powers both a DC motor drive linked to a DC motor of the pump (or whatever) and a regenerative power supply unit (PSU).

The output from the PSU is designed to power a linear amplifier whose output is passed outside the controller to magnetic levitation coils of a magnetic bearing of a vacuum pump (or whatever); the magnitude of the amount of power dram from the PSU and hence the output from the linear amplifier is determined by a feedback control signal to the amplifier from the bearing of a magnitude dependent on the degree of levitation afforded to the rotor so as to maintain the rotor at a predetermined axial position relative to the coils.

When the power supply is removed, rectifier means such as diodes, associated with the motor drive rectify the three-phase power generated by the DC motor which continues to power the regenerative power supply unit. However, with no power source, the output from the motor drive gradually drops to a minimum voltage of, say, 6 volts at which point the magnetic levitation ceases and "back-up" mechanical bearings take over to support the rotor.

In general, this allows a graceful collapse of the rotor on to the mechanical bearings when the AC power is mined off.

However, the operation of such an arrangement is not without its difficulties. For example, the amount of power associated with the regenerative PSU is limited owing to the facts that such units generate considerable quantities of heat which clearly increase with increasing power and that as a result the PSU has itself to be large in size.

In addition, the linear amplifier also has a limited current handling capability in view of the generation of heat therein, again leading to restrictions on the operational parameters of the arrangement as a whole.

Separately, any physical separation of the controller as a whole from the vacuum pump (or whatever) within which it is associated tends necessarily to lead to a substantially immediate collapse of the rotor on to its back-up mechanical bearings leading to possible mechanical shock/damage to the rotor and other components. Generally, such collapse can be tolerated only a few times prior to the pump being irretrievably damaged.

The present invention is concerned with a novel arrangement for powering levitation coils in such types of apparatus which generally allows such difficulties to be overcome.

SUMMARY OF THE INVENTION

In accordance with the invention, there is provided arrangement for driving levitation coils of a magnetic bearing which comprises a DC power source a motor drive device to be powered by the power source a DC motor to be driven by the motor drive the output from the motor to be linked to a switching amplifier the output from the amplifier to be linked to the levitation coils of the magnetic bearing feedback control means from the magnetic bearing to the amplifier such that a predetermined positioning of a rotor associated with the coils can be achieved by varying the amplifier output wherein the DC power source also directly powers the switching amplifier.

Generally, the output from the motor will be a "back" electro-motive force (emf) from the motor. The main function of the motor itself is to drive the pump rotor.

Preferably the DC power source is an AC (mains) rectified power source. Preferably also, the output from the motor drive, and the motor itself, are both three-phase but that a rectifier is positioned between the motor and the switching amplifier to rectify the three-phase supply to a DC supply.

In preferred embodiments of the invention, the motor, three-phase rectifier, the switching amplifier and the levitation coils are all contained in a single housing. The motor drive and any AC/DC rectifier for an AC (mains) power source may be separately contained in another housing with connection means from the power source housing to the motor and, separately, to the switching amplifier being provided.

In the case of a turbo-molecular vacuum pump in particular, the whole of the former housing can usefully be incorporated in to the pump body.

By virtue in particular of the amplifier and the direct powering of the switching amplifier by the power source, the invention obviates the need for a regenerative power supply unit and therefore overcomes the difficulties associated with its use.

In addition, the use of a switching amplifier allows the arrangement as a whole to cope with a much greater range of input voltages to the amplifier and thereby allows a much greater control on the levitation of the rotor associated with the magnetic bearings. In particular the fact that a greater range of electric current outputs can be used with the amplifier means that an increased bearing "stiffness", which is especially important in turbo-molecular vacuum pumps, can be applied to the rotor.

Such an increased current utilisation drawn from the motor is also of benefit in reducing the "vent" time in respect of turbo-molecular vacuum pumps in particular.

BRIEF DESCRIPTION OF THE DRAWINGS

For a better understanding of the invention, reference will now be made, by way of exemplification only, to the accompanying drawing which shows a schematic arrangement for driving levitation coils for a rotor of a turbo-molecular vacuum pump in accordance with the invention.

DETAILED DESCRIPTION

With reference to the drawing, there is shown an arrangement contained in a two part housing; the first housing 1 is associated with a pump controller and the second housing 2 is associated with the general housing for the turbo-molecular pump itself.

The housing 1 has a power supply unit 3 with socket means for receiving an alternating current (main) electric supply and means to rectify the AC supply to a direct current supply.

The power supply unit 3 is linked within the housing 1 to a motor drive 4 of the type described in our European Patent Publication No. 535 916 A with a built-in 3-phase rectifier and whose output is a 3-phase supply current.

The output from the motor drive 4 is then connected to a DC-motor 5 contained in the housing 2 for operation again as described in our European Patent Publication No. 535 916 A.

A separate electric link is also provided between the DC output of the power source 3 and a switching amplifier 9.

Output from the DC motor is then passed to a 3-phase rectifier 6 which rectifies the DC motor output to a DC supply which in turn is delivered to a switching amplifier 7 in a manner which, as described above, obviates the need for a separate regenerative power supply unit of the type employed in prior art arrangements.

The output of the amplifier 7 is then passed to the levitation coils of a magnetic bearing 8; the supply of current to these coils causes the formation of a strong magnetic field which acts on a turbo-molecular vacuum pump rotor present within the coils and, by means known per se causes the rotor to adopt a position within the coils dependent on the size of the current in the coils.

The required axial position of the rotor relative to the coils in use of the vacuum pump can be pre-determined. Sensing means are provided to identify the position of the rotor in the coils relative to the predetermined position and a feed-back control current is supplied to the amplifier 7 via the control 9 which causes the correct size of current to be drawn from the amplifier to power the coils sufficiently to maintain the rotor at the desired pre-determined axial position in the coils.

I claim:

1. An apparatus for driving levitation coils of a magnetic bearing comprising:

a DC power source;

a DC motor having a motor output;

motor drive means powered by the DC power source for driving said DC motor;

a switching amplifier having an amplifier output, the switching amplifer also powered directly by the DC power source;

the motor output from the DC motor connected to said switching amplifier;

the amplifer output from the amplifier connected to the levitation coils of the magnetic bearing; and feedback control means from the magnetic bearing to the amplifier for positioning a rotor associated with the levitation coils in response to said amplifier output of said amplifier.

2. The apparatus according to claim 1 in which the DC power source is an AC rectified power source.

3. The apparatus according to claim 1 in which the output from the motor drive, and the motor itself, are both three phase with a rectifier positioned between the motor and the switching amplifier to rectify the three-phase supply to a DC supply.

4. The apparatus according to claim 1 in which the motor, a three-phase rectifier, the switching amplifier and the levitation coils are all contained in a single housing.

5. The apparatus according to claim 4 in which the motor drive and any AC/DC rectifier for an AC power source is separately contained in another housing with connection means from the power source housing to the motor and, separately, to the switching amplifier being provided.

6. The apparatus according to claim 5 in which the DC motor also drives the pump rotor.

* * * * *